(12) United States Patent
Li et al.

(10) Patent No.: US 11,068,858 B2
(45) Date of Patent: Jul. 20, 2021

(54) SYSTEM FOR HANDLING A FAULT OF AN AIRCRAFT AND A METHOD AND COMPUTER EQUIPMENT FOR ACHIEVING THE SAME

(71) Applicant: Air China Limited, Beijing (CN)

(72) Inventors: Tang Li, Beijing (CN); Yuanbin Li, Beijing (CN); Shijun Zhang, Beijing (CN); Wenjing Bi, Beijing (CN)

(73) Assignee: Air China Limited, Beijing (CN)

( * ) Notice: Subject to any disclaimer, the term of this patent is extended or adjusted under 35 U.S.C. 154(b) by 672 days.

(21) Appl. No.: 15/666,374

(22) Filed: Aug. 1, 2017

(65) Prior Publication Data

US 2018/0165657 A1   Jun. 14, 2018

(30) Foreign Application Priority Data

Dec. 12, 2016   (CN) .......................... 201611138841.4

(51) Int. Cl.
   *G06Q 10/00*   (2012.01)
   *G06Q 50/00*   (2012.01)
   *G07C 5/08*    (2006.01)

(52) U.S. Cl.
   CPC ............ *G06Q 10/20* (2013.01); *G06Q 50/00* (2013.01); *G07C 5/0808* (2013.01); *G07C 5/0816* (2013.01)

(58) Field of Classification Search
   CPC ...... G06Q 10/20; G06Q 50/00; G07C 5/0816; G07C 5/0808; G06N 7/005
   See application file for complete search history.

(56) References Cited

U.S. PATENT DOCUMENTS

2001/0032110 A1*  10/2001  Sinex .................. G06Q 10/025
                                                                701/29.4
2006/0142976 A1    6/2006  Bonanni et al.
(Continued)

FOREIGN PATENT DOCUMENTS

EP      1677172 A2    7/2006
EP      1884852 A1    2/2008
(Continued)

OTHER PUBLICATIONS

Qiang Feng, Yiran Chen, Bo Sun, Songjie Li, "An Optimization Method for Condition Based Maintenance of Aircraft Fleet Considering Prognostics Uncertainty", The Scientific World Journal, vol. 2014, Article ID 430190, 8 pages, 2014. https://doi.org/10.1155/2014/430190 (Year: 2014).*

(Continued)

*Primary Examiner* — Gerardo Araque, Jr.
(74) *Attorney, Agent, or Firm* — Oppedahl Patent Law Firm LLC

(57) ABSTRACT

The present application relates to a system and a method for handling a fault of an aircraft. The system for handing a fault of an aircraft comprises an interface module for receiving the fault message and a troubleshooting decision-making unit for making a troubleshooting decision against the aircraft faults, wherein the troubleshooting decision is made by the troubleshooting decision-making unit based on fault types/safety risks and cost estimation. The examples in the application allow a cost-effective troubleshooting decision.

21 Claims, 3 Drawing Sheets

(56) References Cited

U.S. PATENT DOCUMENTS

| | | | |
|---|---|---|---|
| 2009/0055339 A1* | 2/2009 | Bernard | G05B 23/0283 |
| | | | 706/46 |
| 2010/0017241 A1* | 1/2010 | Lienhardt | G06Q 10/00 |
| | | | 705/7.12 |
| 2010/0241293 A1 | 9/2010 | Ganguli et al. | |
| 2011/0218783 A1* | 9/2011 | Maurin | G06F 30/15 |
| | | | 703/2 |
| 2017/0323403 A1* | 11/2017 | Johnson | G06Q 10/06315 |

FOREIGN PATENT DOCUMENTS

| | | |
|---|---|---|
| JP | 2013175157 A | 9/2013 |
| JP | 2016045936 A | 4/2016 |

OTHER PUBLICATIONS

Ahmet Atak, Sytze Kingma, Safety culture in an aircraft maintenance organisation: A view from the inside, Safety Science, vol. 49, Issue 2, 2011, pp. 268-278, ISSN 0925-7535, https://doi.org/10.1016/j.ssci.2010.08.007. (https://www.sciencedirect.com/science/article/pii/S0925753510002201) (Year: 2011).*

Hobbs, Alan; Williamson, Ann "Unsafe acts and unsafe outcomes in aircraft maintenance" Ergonomiccs 45.12: 866-882, Taylor and Francis Ltd., Oct. 10, 2002 (Year: 2002).*

Extended European search report in European application No. 17185914.3, dated Oct. 18, 2017.

English translation of Notification Letter from Taiwan patent office, dated Dec. 15, 2020 in application No. 10921227200.

Notice for Reasons from Japanese patent office, dated Nov. 17, 2020 in application No. 2017-154437.

\* cited by examiner

SYSTEM FOR HANDLING A FAULT OF AN AIRCRAFT AND A METHOD AND COMPUTER EQUIPMENT FOR ACHIEVING THE SAME

TECHNICAL FIELD

The present application relates to a system for handling a fault of an aircraft and a method as well as computer equipment for achieving the same.

BACKGROUND

Since aircraft maintenance cost is an influential actor in the operation of aviation companies, how to reduce the cost has become a cause of concern for all aircraft suppliers. Currently, the major solution focus on the control on routine checks, including minimizing the non-service time of aircrafts, maximizing the time period of aircraft use and the maintenance cycle of aircrafts parts, optimizing the human resources of maintenance personnel and their workload, as well as making full use of facilities and hangars. As to a sudden aircraft fault, there are as yet no better way to control the cost except optimizing the maintenance personnel and their workload.

SUMMARY

In response to one or more above-mentioned problems, the examples of the present application provide a system and a method for handling a fault of an aircraft.

According to one aspect of the present application, a system for handling a fault of an aircraft is provided, comprising:

An interface module for receiving a fault message of an aircraft; and

A troubleshooting decision-making unit for making a troubleshooting decision against the aircraft faults, wherein the troubleshooting decision is made by the troubleshooting decision-making unit based on fault types and cost estimation.

In an example, the making of the troubleshooting decision by troubleshooting decision-making unit based on fault types/safety risks and cost estimation comprises:

Determining whether the fault is retainable or not;

In response to that the fault is retainable, calculating the fault retention cost generated for continuing the flight with the fault retained until to a planned maintenance time and/or at a planned maintenance location for repair and calculating the field maintenance cost for said fault;

Comparing the fault retention cost with the field maintenance cost;

In response to that the fault retention cost is higher than the field maintenance cost, making a troubleshooting decision for field maintenance on said fault; and In response to that the fault retention cost is equal to or lower than the field maintenance cost, making a troubleshooting decision for fault retention to continue the flight.

In an example, said troubleshooting decision-making unit calculates said field maintenance cost according to one or more of the following: cost of abnormal flight cost, the cost of the changes in other flights disrupted by the fault, the cost of providing the required aviation materials, the cost of urgent maintenance in other places, and the cost of work hour for the maintenance.

In an example, said troubleshooting decision-making unit calculates said fault retention cost according to one or more of the following: a cost of the flight operating limitation caused by retaining said fault, and an abnormal flight cost and a fault maintenance cost caused by the non-retainable fault of fault-associated parts during the retention period.

In an example, said troubleshooting decision-making unit determines the probability of occurrence for a non-retainable fault developed by the fault-associated parts during the retention period.

In an example, said troubleshooting decision-making unit obtains the weight value of abnormal flight cost and fault maintenance cost resulting from said non-retainable fault according to said probability of occurrence, calculating said fault retention cost.

In an example, said troubleshooting decision-making unit calculates said fault retention cost according to the following formula:

$$C_K=P^*(C_L+C_{EP}+C_{MP})+(1-P)^*C_L,$$

Wherein:

$C_K$ indicates said fault retention cost;

$C_L$ indicates said cost of flight operating limitation caused by retaining said fault;

P indicates said weight value obtained according to said probability of occurrence;

$C_{EP}$ indicates the abnormal flight cost generated by said non-retainable fault developed by the fault-associated parts during the retention period;

$C_{MP}$ indicates the fault maintenance cost generated by said non-retainable fault developed by the fault-associated parts during the retention period.

In an example, said weight value is equal to said probability of occurrence.

In an example, said troubleshooting decision-making unit obtains said probability of occurrence by analyzing the performance of said fault-associated parts or the failure probability distribution of said fault-associated parts.

In an example, the troubleshooting decision of retaining said fault to continue a flight comprises the planned time and/or planned location for repairing said fault.

In an example, said troubleshooting decision-making unit identifies a work-hour period with lower utilization rate for maintenance personnel, and arrange said planned time in said work-hour period with lower utilization rate.

In an example, the system for handling a fault of an aircraft also comprises a fault diagnosis module communicably coupled with an interface module and configured to find the cause of the fault through diagnosis according to said fault message.

In an example, the system for handling a fault of an aircraft further comprises a fault-handling solution generation unit to generate a fault-handling solution according to the result of fault diagnosis outputted by the fault diagnosis module, wherein said fault-handling solution comprises: a task, maintenance instruction and/or aviation materials and tools necessary to repair the fault.

According to another aspect of the present application, a method for handling a fault of an aircraft is provided, comprising:

receiving an aircraft fault message through an interface module; and generating a troubleshooting decision for the fault based on fault types and cost estimation.

In an example, the generation of troubleshooting decision based on fault types and cost estimation comprises:

determining whether the fault is retainable or not;

In response to that the fault is retainable after identification, calculating the fault retention cost generated for continuing the flight with the fault retained until to a planned maintenance time and/or at a planned maintenance location for repair and calculating the field maintenance cost for said fault;

Comparing the fault retention cost with the field maintenance cost;

In response to that the fault retention cost is higher than the field maintenance cost, making a troubleshooting decision for field maintenance on said fault; and In response to that the fault retention cost is equal to or lower than the field maintenance cost, making a troubleshooting decision for fault retention to continue the flight.

In an example, said field maintenance cost is calculated according to one or more of the following: cost of abnormal flights, cost of the changes in other flights disrupted by the fault, the cost of providing the required aviation materials, the cost of urgent maintenance in other places, and the cost of work hour for the maintenance.

In an example, said fault retention cost is calculated according to one or more of the following: cost of the flight operating limitation as a result of retention of said fault, or the cost of an abnormal flight and the fault maintenance cost incurred by the non-retainable fault of fault-associated parts during a retention period.

In an example, the method for handling a fault of an aircraft further comprises determining the probability of occurrence for a non-retainable fault developed by the fault-associated parts during the retention period.

In an example, the weight value of abnormal flight cost and fault maintenance cost resulting from said non-retainable fault is obtained according to said probability of occurrence for calculating said fault retention cost.

In an example, said fault retention cost is calculated according to the following formula:

$$C_K = P^*(C_L + C_{EP} + C_{MP}) + (1-P)^* C_L,$$

wherein:

$C_K$ indicates said fault retention cost;

$C_L$ indicates said cost of flight operating limitation caused by retaining said fault;

P indicates said weight value obtained according to said probability of occurrence;

$C_{EP}$ indicates the abnormal flight cost generated by said non-retainable fault developed by the fault-associated parts during the retention period;

$C_{MP}$ indicates the fault maintenance cost generated by said non-retainable fault developed by the fault-associated parts during the retention period.

In an example, said weight value is equal to said probability of occurrence.

In an example, said probability of occurrence is obtained by analyzing the performance of said fault-associated parts or the failure probability distribution of said fault-associated parts.

In an example, the troubleshooting decision of retaining said fault to continue a flight comprises the planned time and/or planned location for repairing said fault.

In an example, the method for handling a fault of an aircraft comprises determining a work-hour period with lower utilization rate for maintenance personnel, and arrange said planned time in said work-hour period with lower utilization rate.

In an example, the method for handling a fault of an aircraft further comprises finding the cause of the fault through diagnosis according to said fault message.

In an example, the method for handling a fault of an aircraft further comprises generating a fault-handling solution according to the result of fault diagnosis, wherein said fault-handling solution comprises: a task, maintenance instruction and/or aviation materials and tools necessary to repair the fault.

According to another aspect of the present application, a method for handling a fault of an aircraft is provided, comprising:

determining whether the fault can be retained or not;

In response to that the fault is retainable, calculating the fault retention cost generated for continuing the flight with the fault retained until to a planned maintenance time and/or at a planned maintenance location for repair and calculating the field maintenance cost for said fault;

Comparing the fault retention cost with the field maintenance cost; and

In response to that the fault retention cost is higher than the field maintenance cost, making a troubleshooting decision for field maintenance on said fault.

According to another aspect of the present application, a method for handling a fault of an aircraft is provided, comprising:

determining whether the fault is retainable or not;

In response to that the fault is retainable, calculating the fault retention cost generated for continuing the flight with the fault retained until to a planned maintenance time and/or at a planned maintenance location for repair and calculating the field maintenance cost for said fault;

Comparing the fault retention cost with the field maintenance cost; and

In response to that the fault retention cost is equal to or lower than the field maintenance cost, making a troubleshooting decision for fault retention to continue the flight.

In an example, said field maintenance cost is calculated according to one or more of the following: cost of an abnormal flight, the cost of changes in other flights disrupted by the fault, the cost of providing the required aviation materials, the cost of urgent maintenance in other places, and the cost of work hour for the maintenance.

In an example, said fault retention cost is calculated according to one or more of the following: a cost of flight operating limitation as a result of retention of said fault, and an abnormal flight cost and a fault maintenance cost caused by the non-retainable fault of fault-associated parts during the retention period.

In an example, the method for handling a fault of an aircraft further comprises determining the probability of occurrence for a non-retainable fault developed by the fault-associated parts during the retention period.

In an example, the weight value of abnormal flight cost and fault maintenance cost resulting from said non-retainable fault is obtained according to said probability of occurrence for calculating said fault retention cost.

In an example, said fault retention cost is calculated according to the following formula:

$$C_K = P^*(C_L + C_{EP} + C_{MP}) + (1-P)^* C_L,$$

wherein:

$C_K$ indicates said fault retention cost;

$C_L$ indicates said cost of flight operating limitation caused by retaining said fault;

P indicates said weight value obtained according to said probability of occurrence;

$C_{EP}$ indicates the abnormal flight cost generated by said non-retainable fault developed by the fault-associated parts during the retention period;

$C_{MP}$ indicates the fault maintenance cost generated by said non-retainable fault developed by the fault-associated parts during the retention period.

In an example, said weight value is equal to said probability of occurrence.

In an example, said probability of occurrence is obtained by analyzing the performance of said fault-associated parts or the failure probability distribution of said fault-associated parts.

In an example, the troubleshooting decision of retaining said fault to continue a flight comprises the planned time and/or planned location for repairing said fault.

In an example, the method for handling a fault of an aircraft comprises determining a work-hour period with lower utilization rate for maintenance personnel, and arrange said planned time in said work-hour period with lower utilization rate.

In an example, the method for handling a fault of an aircraft comprises finding the cause of the fault through diagnosis according to said fault message.

In an example, the method for handling a fault of an aircraft further comprises generating a fault-handling solution according to the result of fault diagnosis, wherein said fault-handling solution comprises: a task, maintenance instruction and/or aviation materials and tools necessary to repair the fault.

According to another aspect of the present application, computer equipment for handling a fault of an aircraft is provided, comprising:

A memory for storing instructions executable by a computer;

A processor for accessing said memory and executing said instructions executable by said computer stored in said memory; the execution of said instructions executable by said computer by said processor enables said computer equipment to perform said method for handling a fault of an aircraft.

According to another aspect of the present application, a system for handling a fault of an aircraft is provided, comprising:

A unit for determining whether the fault is retainable or not;

A unit, in response to that the fault is retainable, for calculating the fault retention cost generated for continuing the flight with the fault retained until to a planned maintenance time and/or at a planned maintenance location for repair and calculating the field maintenance cost for said fault;

A unit for comparing the fault retention cost with the field maintenance cost; and A unit, in response to that the fault retention cost is higher than the field maintenance cost, for making a troubleshooting decision of field maintenance on said fault.

According to another aspect of the present application, a system for handling a fault of an aircraft is provided, comprising:

A unit for determining whether the fault is retainable or not;

A unit, in response to that the fault is retainable, for calculating the fault retention cost generated for continuing the flight with the fault retained until to a planned maintenance time and/or at a planned maintenance location for repair and calculating the field maintenance cost for said fault;

A unit for comparing the fault retention cost with the field maintenance cost; and A unit for making a troubleshooting decision of fault retention to continue the flight in response to that the fault retention cost is equal to or lower than the field maintenance cost.

The examples of the present application allow a cost control on the aircraft fault handling based on safety concerns. In other words, it lowers the operating cost of aircraft while ensuring its flight safety.

BRIEF DESCRIPTION OF THE DRAWINGS

In these figures, unless otherwise specified, same reference sign indicates the same or similar part or component. The figures, through examples, generally illustrate, rather than limit, the examples of the present application. These figures may not be provided on a pro rata basis.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Before a detailed description about typical examples, it should be noted that some exemplary examples are illustrated as an arrangement or a method as shown in the flow charts. Although the flow charts describe each operation in sequence, many operations may be implemented concurrently or simultaneously. In addition, the sequence for the implementation of each operation may be rearranged. Said arrangement may be ended when the operations complete, but it may include additional steps not present in the Figures. Such an arrangement may correspond to a method, a function, a regulation, a subroutine, a subprogram, etc.

The methods discussed below (some are illustrated by flow chart) can be implemented by hardware, software, firmware, middleware, microcode, hardware description language or any combination thereof. When software, firmware, middleware or microcode is employed, the procedure code or code segment used to perform the necessary tasks can be stored in the readable medium (e.g. memory medium) in a machine or computer. One or more processors are able to perform necessary tasks.

Figure 1:
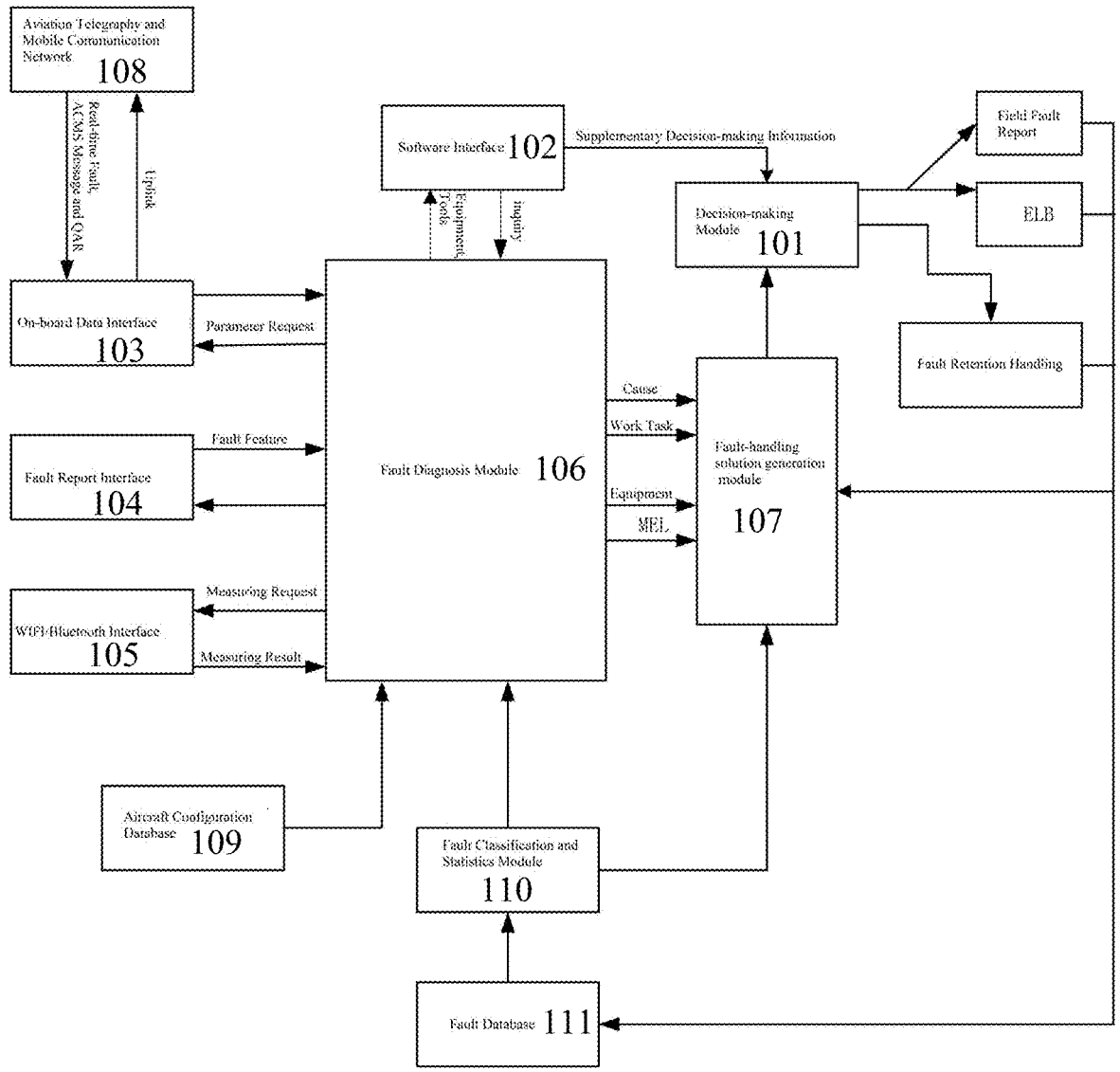
FIG. 1 is a schematic diagram showing the composition of a module of the system for handling a fault of an aircraft according to one example of the present application.

FIG. 1 is a schematic diagram showing the composition of a module of the system for handling a fault of an aircraft according to one example of the present application. Such modules can be achieved by operating one or more software programs in a computer/computer system, hardware/firmware parts and/or the combination thereof of a computer/computing equipment. The computer/computing equipment may comprise a local memory device and/or a remotely-accessible memory device connected to a network.

As shown in FIG. 1, the system 100 for handling a fault of an aircraft comprises various interface modules (such as onboard data interface 103, fault report interface 104, WIFI/bluetooth interface 105 and software interface 102) and a decision-making module 101. The interface modules are used to receive or acquire fault-related data and/or messages. For example, the onboard data interface 103 of the system 100 for handling a fault of an aircraft requests or receives such onboard data as real-time fault, ACMS report, QAR and fault maintenance sheet through an aviation telecommunication network/mobile communication network 108, e.g. the system 100 for handling a fault of an aircraft can be directly or indirectly connected to the aviation telecommunication network/mobile communication network 108 through a Ethernet network interface, a WIFI interface and a mobile communication interface. As an interactive interface between the system 100 for handling a fault of an aircraft and the users, the fault report interface 104 can be applied by the users to input fault report or other fault messages to the system 100 for handling a fault of an aircraft. The fault report interface can be a mouse, a keyboard, a displayer or a combinations thereof. The WIFI/bluetooth interface 105 is the interface between the system 100 for handling a fault of an aircraft and various measuring tools/equipment, through which the system 100 sends a measuring request to the measuring tools/equipment and receives the measuring results therefrom. The software interface 102 is an interactive interface that links the system 100 for handling a fault of an aircraft with other software applications or software modules, for example, the system 100 for handling a fault of an aircraft can check the devices and tools required by the repair of the fault through the software interface 102 as well as receive other status messages sent by other related software systems. Also, system 100 may receive the fault maintenance sheets from other software systems through the software interface. The decision-making module 101 generates a troubleshooting decision based on fault types/safety risks and cost estimation. In an example, a field maintenance or fault retention decision is generated by the decision-making module 101 based on safety risks and cost estimation. In regard to the fault retention decision, a fault retention arrangement will be implemented on the aircraft. Regarding the field maintenance decision, a field fault report is generated and/or a fault is recorded in the ELB for maintenance personnel's reference. In another example, the decision-making module 101 may calculate the cost of operating limitation or abnormal flight cost based on the supplementary decision-making information of software interface 102, e.g. the flight scheduling information, in the course of making a troubleshooting decision. The process conducted by the decision-making module 101 is elaborated in FIG. 2.

As shown in FIG. 1, the system 100 for handling a fault of an aircraft also comprises a fault diagnosis module 106, a solution generating module 107 for handling fault, an aircraft configuration database 109, a fault classification and statistical module 110 and a fault database 111. The fault diagnosis module 106 is communicably coupled with the interface module and configured to find the cause of the fault through a fault diagnosis according to said fault message. The aircraft configuration database 109 records the type, hardware configuration and set membership (the relationship between aircraft system and its components), functional position of hardware, limitation of interchangeability, aircraft performance and cabin layout of each aircraft. The fault database 111 keeps fault handling records, including fault feature of each fault (for example, one or more of fault description, fault code, text message, light message and indication message), steps for locating the fault, and identified cause of the fault. The fault classification and statistical module 110 classifies the fault handling records in the fault database to find out the possible fault causes for the same or similar faults and the probability of occurrence for each possible fault cause. In the course of fault diagnosis, the fault diagnosis module 106 acquires the fault message and the required fault-associated data from the interface module by interacting with users, test equipment or other software systems. The fault diagnosis module 106 can further search the aircraft configuration database 109 for acquiring the configuration data of the aircraft and based on which to find the fault statistical data corresponding to aircraft configuration and fault information from the fault classification and statistical module 110, then finding the fault cause according to the fault statistical data. In an example, the fault diagnosis module 106 is configured as: in response to the fault indication from the fault data in the interface module and the aircraft configuration data from the aircraft configuration database, search one or more fault causes corresponding to the obtained fault indication and aircraft configuration data by accessing the fault classification and statistical module 110, foster the steps for locating the fault corresponding to the potential fault cause according to the probability of occurrence relevant to each possible fault cause, and identify the fault cause. The probability of occurrence corresponding to each possible fault cause is acquired by an analysis of a large number of statistical data. Such probability of occurrence may possess a defaulted or pre-estimated initial value and is updated on a real-time basis according to the resultant location of each fault.

According to an example of the present application, the fault diagnosis module 106 is configured to facilitate the implementation of fault location steps corresponding to each associated possible fault cause on the basis of a high-to-low probability of occurrence until the fault cause is located. For example, the fault diagnosis module 106 may be configured to identify the first possible fault cause with the highest probability of occurrence from one or more searched possible fault causes and promote the implementation of fault location steps corresponding to the first possible fault cause. If the result shows that the fault is not caused by the first possible fault cause, the fault diagnosis module 106 may be further configured to identify the fault cause with the second highest probability of occurrence from the remaining searched fault causes and promote the implementation of fault location steps corresponding to the second possible fault cause. The procedures can be repeated until the real fault cause is found. In response to that the probability of occurrence of the plurality of possible fault causes is the same or non-existent (for example, the system is in an original state without using data), the fault diagnosis module 106 is configured to promote the implementation of fault location steps corresponding to each of said possible fault causes randomly. According to another example, the fault diagnosis module 106 can also be configured to provide one or more possible fault causes and their probabilities of occurrence for user altogether for selection and promote the implementation of fault location steps corresponding to the selected fault cause by users.

In the examples described above, the implementation of fault location steps promoted by fault diagnosis module 106 may comprise the following: the fault diagnosis module 106 is configured to indicate the users to implement relevant fault location steps and send the feedback about the resultant fault location steps to the interface module 106 through the interface module, that is, if the possible fault cause is the true fault cause. Alternatively, the fault diagnosis module 106 can further be configured to automatically complete the fault location steps through the exchange with the test center connected to the faulted device, and the implementation results of fault location steps are sent back to fault diagnosis module 106 through the interface module.

According to another example, the fault diagnosis module 106 is also configured to indicate users to find the fault cause on their own if the implementation results of fault location steps show that all the possible fault causes included in the relevant fault location records are not true fault causes. In response to the fault causes found and input by the users themselves, the fault diagnosis module 106 guides the users to input the identified fault cause and determines the fault location steps required by said fault causes.

The fault location steps corresponding to possible fault causes in the examples above can either be acquired by the fault diagnosis module 106 through the fault classification and statistical module 110, or by the fault diagnosis module 106 accessing other databases (such as FIM service database), or be input by the users.

Now "BLEED TRIP OFF" is used as an example to illustrate the operation of fault diagnosis module 106. After receiving the fault indication of "BLEED TRIP OFF" through the interface module, the fault diagnosis module 106 acquires the following possible fault causes and their probability of occurrence that corresponding to aircraft configuration data and fault indications from the fault classification and statistical module 110:

| | |
|---|---|
| Fault of precooler control valve | 10% |
| Fault of precooler controlling valve sensor | 15% |
| Fault of 450° F. thermometer | 3% |
| Fault of high-pressure bleed air regulator | 5% |
| Fault of high-pressure bleed air valve | 8% |
| Fault of bleed air regulator | 12% |
| Fault of sense line | 7% |
| Fault of precooler sealing gasket | 6% |
| Fault of precooler | 20% |
| Fault of 490° F. overheating switch of Engine 1 (Engine 2) | 14% |

It can be seen that the fault with the highest probability of occurrence corresponds to the possible cause of (9) Fault of precooler. In other words, the fault diagnosis module 106 determines the strategy to address the fault based on the searching results of fault location. For example, it can indicate users to execute the fault location steps corresponding to (9) Fault of precooler or provide the possible fault causes above on the basis of a high-to-low probability of occurrence to the users for selection.

After the fault cause is diagnosed by the fault diagnosis module 106, the fault cause, together with the required work task, equipment and relevant Minimum Equipment List, will be sent to the solution generating module 107 for handling fault. The solution generating module 107 for handling fault generates relevant fault handling solutions according to the information provided by the fault diagnosis module 106 and sends the fault causes and solutions to the decision-making module 101. The fault handling solutions comprise: the work task involved in the fault maintenance, maintenance instructions and/or conditions of required aviation materials and tools. It is noted that the fault diagnosis module 106 and the solution generating module 107 for handling fault are not indispensable in the present invention. For example, the fault causes can also be input or sent to the decision-making module 101 after identified by users or other personnel or equipment. With respect to the work tasks involved in the fault maintenance, maintenance instructions and conditions of required aviation materials and tools, they also can be manually input or acquired by the decision-making module 101 from other equipment, modules, database or software applications. Although the example in FIG. 1 shows that the system for handling a fault of an aircraft comprises a fault diagnosis module 106, a solution generating module 107 for handling fault, an aircraft configuration database 109, a fault classification and statistical module 110 and a fault database 111, it is understandable that one or more of the modules can also be applied in other equipment or systems.

Figure 2:
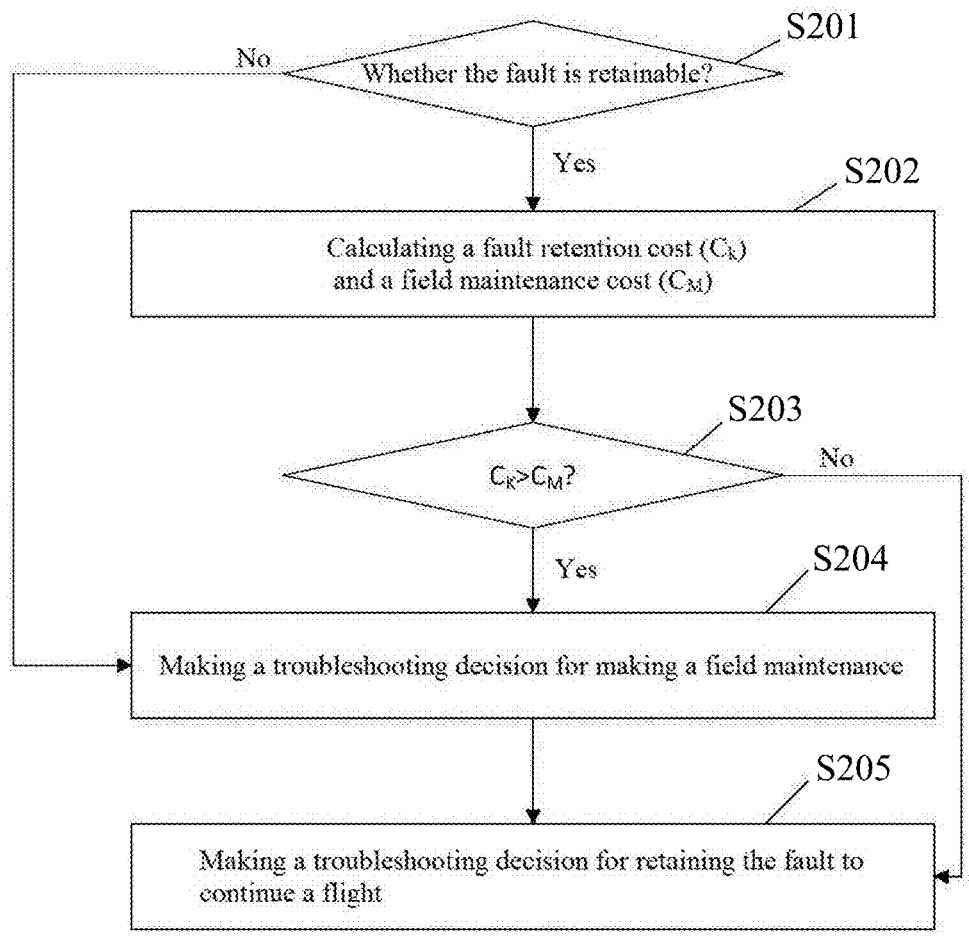
FIG. 2 is a flow diagram showing the method for handling a fault of an aircraft according to one example of the present application.

FIG. 2 is a flow diagram showing how the decision-making module 101 makes a decision.

Step S201 determines whether a fault is retainable or not.

In an example, the faults can be divided into retainable or non-retainable faults based on safety concerns. The retainable fault means that air safety will not be affected if the flight continues with this fault. Put differently, the retainable fault allows the aircraft to fly without handling the fault. If the fault is a non-retainable one, a field maintenance is required instead of keeping the fault while the flight is not allowed to continue. In an example, whether the fault is retainable may be determined according to MEL. In another example, a NO GO fault, a short-term fault or a long-term fault is also included into a retainable fault. For instance, Full Authority Digital Engine Control (FADEC) of Boeing 737-NG diagnoses such maintenance information as 150 and 750 flight hours limits, they are also regarded as short-term faults as they have to be handled within the time limit. As to the long-term fault, troubleshooting is allowed to be conducted in the next Check. In another example, any fault that causes no safety risk can be deemed as a retainable fault. Once the fault cause is identified, a reference to Minimum Equipment List and/or other methods can be used to determine whether the fault is retainable. This step can be either performed by the decision-making module 101 or by the fault diagnosis module 106 or other modules which then send the result to the decision-making module 101. In another example, some faults can be identified directly whether they are retainable ones in light of their features instead of the fault causes. For example, if an alarm of "CABIN ALT AUTO L" is given by EICAS of Boeing 777, the relevant fault is determined as "Auto Cabin Pressure Control L/R" and identified as a retainable fault according to 21-31-01 of MEL. Another example is that, according to the descriptions about Precooler Controlling Valve of the MEL for Boeing 737-800, if an alarm of "BLEED SYSTEM DISENGAGEMENT" is issued by the cockpit, the disengagement cause has to be ruled out if the description is used to support the retention of the fault. If the fault belongs to the one that cannot be retained, it is identified as a non-retainable fault.

In response to a non-retainable fault determined in step S201, step S202 follows, calculating the fault retention cost $C_K$ generated for continuing the flight with the fault retained until to a planned maintenance time and/or at a planned maintenance location for repair and calculating the field maintenance cost $C_M$ for said fault.

The field maintenance cost $C_M$ is calculated by one or more of the following: cost of the abnormal flight cost incurred by fault maintenance, the cost of the changes in other flights disrupted by the fault, the cost of providing the required aviation materials, the cost of urgent maintenance in other places, and the cost of work hour for the maintenance. The abnormal flight cost incurred by fault maintenance and the cost of the changes in other flights disrupted by the fault can be measured, for example, by the product of the delayed flight hours and the predetermined cost per hour. The cost of providing the required aviation materials can be divided into material repairing cost and material renting cost according to the conditions of the current aviation materials. The cost of urgent maintenance in other places refers to cost generated in the travel by maintenance personnel between different places, and the cost of work hour for the maintenance means the time consumed by the maintenance personnel in the field maintenance.

The fault retention cost $C_K$ is calculated based on one or more following factors: the flight operating limitation cost as a result of retention of said fault, the abnormal flight cost incurred by the non-retainable fault of fault-associated parts during the retention period, and the fault maintenance cost. The flight operating limitation cost refers to the loss caused by load reduction for safety considerations for an aircraft while the fault is retainable. Meanwhile, the flight operating limitation cost should be measured based on the configuration data of the aircraft, for instance, the same load reduction limitation that works for a large-configuration aircraft may become out of operation for small-configuration ones.

During the fault retention period, if the fault-associated parts break down, a field maintenance may be implemented according to MEL as the fault may not be retained. The resultant field maintenance cost comprises the possible cost of work hour for the maintenance, the possible cost of providing the required aviation materials, and the possible cost of urgent maintenance in other places. The possibility here means the probability for associated parts to develop a fault within the fault retention period. The "associated parts" refers to the parts associated with the retainable faults, and the retainable faults will turn to be non-retainable ones if the associated parts also break down in the fault retention period. The identification of associated parts is based on MEL and/or historical data. For a retainable fault, MEL recites its associated parts and describes the conditions for a fault developed by associated parts turning into a non-retainable one. Besides MEL, historical data are also used to determine the associated parts with a retainable fault. MEL may not predict or find all associated parts. If a retainable fault turns into a non-retainable one as MEL repeatedly finds a part in failure or having a fault, the fault can be determined as a part associated with the fault according to historical records. While calculating the fault retention cost $C_K$, the decision-making module determines the probability of occurrence for the fault-associated part to develop a non-retainable fault during the fault retention period. According to an example, the decision-making unit is able to obtain the probability of occurrence for a non-retainable fault through a performance analysis on the fault-associated part or an analysis on the failure probability distribution of the fault-associated part. For example, for the parts suitable for performance analysis, the decision-making module calculates the probability of occurrence of a fault according to the decline rate of main performance indexes. For the parts unsuitable for performance analysis, the decision-making module calculates the probability of occurrence of a fault according to the failure probability distribution during the fault retention period.

The decision-making module can further obtain the weight value of abnormal flight cost and fault maintenance cost resulting from the non-retainable fault of associated parts for calculating the fault retention cost $C_K$. In an example, the decision-making module calculates the fault retention cost according to the following formula:

$$C_K = P^*(C_L + C_{EP} + C_{MP}) + (1-P)^* C_L,$$

Wherein:

$C_K$ indicates said fault retention cost;

$C_L$ indicates said cost of flight operating limitation caused by retaining said fault;

P indicates the weight value obtained according to the probability of occurrence; in one example, the weight value equals the probability of occurrence;

$C_{EP}$ indicates the abnormal flight cost generated by the non-retainable fault developed by the fault-associated parts during the retention period; and $C_{MP}$ indicates the fault maintenance cost generated by the non-retainable fault developed by the fault-associated parts during the retention period.

Then compare the field maintenance cost $C_M$ with the fault retention cost $C_K$ in step S203.

If $C_K > C_M$, step S204 follows and the troubleshooting decision of field maintenance is made; and If $C_K \leq C_M$, step S205 follows and the troubleshooting decision of fault retention is made to continue the flight. The troubleshooting decision of fault retention to continue the flight comprises the planed time and/or place for fault maintenance that are determined by the decision-making unit based on the principle of a minimum cost. For example, in determining the planned time, the decision module identifies a work-hour period with lower utilization rate for maintenance personnel so as to arrange the planned time within said period.

In response to a non-retainable fault determined in step S201, step S204 follows to make a troubleshooting decision of field maintenance for the fault.

Figure 3:
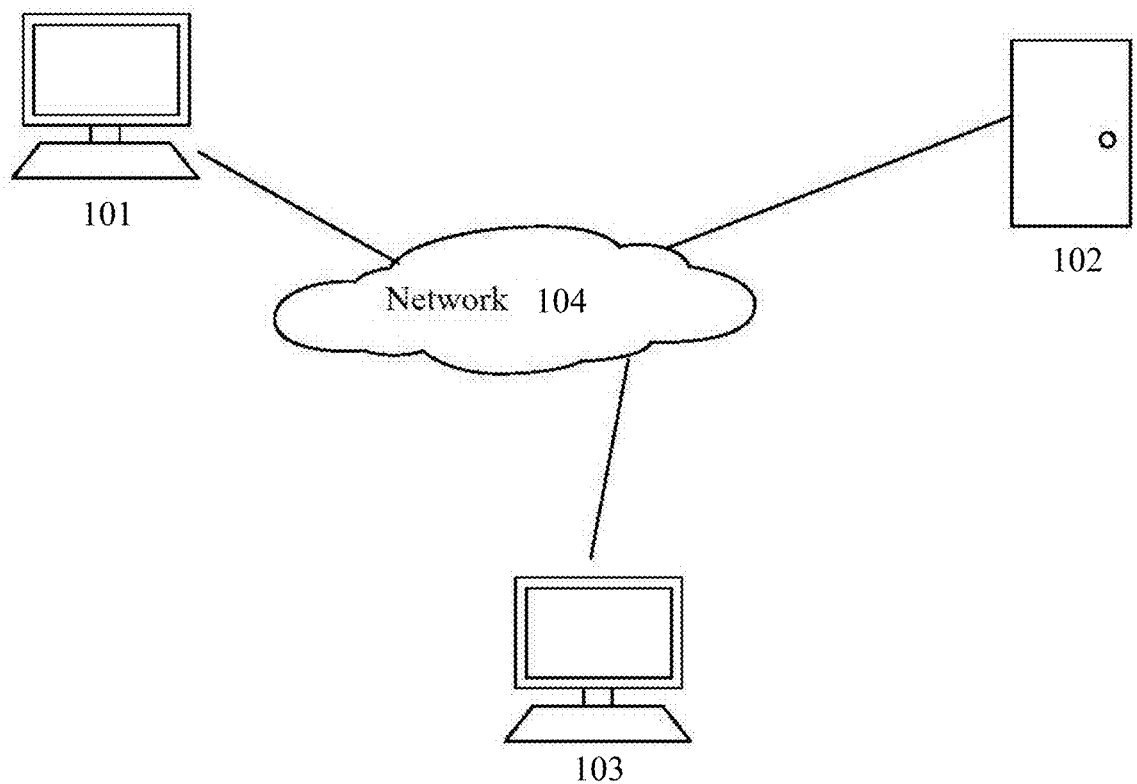
FIG. 3 is a composition diagram showing the network environment of the system for handling a fault of an aircraft according to one example of the present application.

FIG. 3 is a composition diagram showing the network environment of the system for handling a fault of an aircraft according to one example of the present application. The system for handling a fault of an aircraft in the examples of the present application can be applied in an individual computing device 101, or several computing devices 101 and 103 that are communicated with each other through network 104, or a server 102 and/or one or more computing devices 101 and 103 that are communicated with the server 102 through network 104. The one or more computing devices 101 and 103 or the server 102 of the system for handling a fault of an aircraft in the examples of the present application may comprise a memory for storing instructions executable by a computer, and a processor for accessing the memory and executing the instructions executable by the computer stored in said memory. The execution of the instructions executable by said computer by said processor enables the computing devices 101 and 103 or the server 102 to perform said method for handling a fault of an aircraft.

Computing devices 101 and 103 can be any suitable terminal devices, including but not limited to personal computer, laptop, desktop computer, tablet PC, personal digital assistant, server, and mobile, wherein the present invention can be realized either by operating said terminal device and/or computing device separated or by the interactive operation between said terminal device and/or computing device after accessing network and other computers in the network, wherein the network of said terminal device/computing device includes but not limited to network, mobile communication network, WAN, MAN, LAN and VPN. The devices in the network include but not limited to a single network server, a network server group consisting of a plurality of network servers, or the cloud consisting of a number of computers or network servers on the basis of cloud computing, wherein the cloud computing, as one of distributed computings, is a super virtual computer consisting of a group of loosely-coupled computer set.

It should be noted that said terminal device, computing device, network device and network are only recited as examples. Other present or future possible computing device or network, if applicable, should also be included under the protection scope of the present invention and cited herein as reference.

It should be understood that the method, system and device disclosed in the examples of the present application can be achieved by other approaches. The device examples as described above are only schematic, for example, the division of modules or units is only made only on the basis of logics. There are other possible divisions in the practical operation, for instance, a plurality of modules or components may be combined together or integrated into another system, some features may be neglected or not performed. The components showed or described may be coupled or directly coupled or connected communicably together through an indirect coupling or communicable connection among some interfaces, devices or modules. Such coupling can be made possible electronically, mechanically or in other form.

In the description, the module or unit "is configured to" means that such modules or units take form of hardware (e.g. a processor and a memorizer) or software or firmware when the process unit of a processor performs software (application) or firmware instruction.

The module or unit as a separate part described above can selectively be physically separate, so do the parts as a module or a unit display. That is, they can either be arranged in one place or in a plurality of network units. The goal of examples can be achieved by some of the units or all units according to practical requirements.

In addition, each functional module or unit in the examples of the present invention can be integrated all in one processing module or unit, or used as one module or unit. In other cases, two or more modules or units can be integrated into one module or unit. Such integrated modules or units can be achieved by hardware or the functional module or unit of hardware, software, firmware or the combination thereof.

A person skilled in the art can understand the present invention as follows: all or part of steps defined in the method examples of the present application can be realized by hardware with programmed-instruction. Such programs can be stored in a storage medium readable by a computer. The steps in the method examples above are performed in the implementation of such programs. The storage medium above comprises mobile storage device, read-only memory, random access memory, disk, compact disc and other medium that stores program identifier.

Alternatively, in case that the integrated units above take form of software functional module and are sold or used as separate products, they can also be stored in a storage medium readable by a computer. On this basis, the contribution of the technical solution in the examples over the prior art substantially is a software product in a sense. The computer software product is stored in a storage medium, including some instructions to enable a computer (as a personal computer, server, or network device, etc.) to perform part of or all the method in the examples. Said storage medium comprises mobile storage device, ROM, RAM, disk, compact disc and other medium that stores program code.

The examples of the present application allow a cost control on the aircraft fault. Specifically, the present application ensures a safe flight while minimizing the cost of fault maintenance, thereby lowing the cost of aircraft operations.

The descriptions above only represent the specific examples of the present invention, but the protection scope is not limited here. Based on the disclosure above, any person skilled in the art is easily aware that a change or substitution about the contents above will also fall into the protection scope of the present invention. Therefore, the protection scope thereof should be subject to the claims.

We claim:

1. A system for handling a fault of an aircraft, comprising:
an interface module comprising the following items: an onboard data interface between the system and an aviation telecommunication network or a mobile communication network configured to receive onboard data, a fault report interactive interface between the system and a user configured to receive a fault report inputted by the user, a WIFI/bluetooth interface between the system and a measuring tool or a measuring equipment configured to receive a measuring result of the measuring tool or the measuring equipment, and a software interface between the system and a software application or a software module configured to interact with the software application or the software module, wherein the onboard data comprise one or more of a real-time fault, an ACMS report, QAR data, and a fault maintenance sheet;
one or more processors; and
a storage device configured for storing one or more programs, wherein the one or more programs are executed by the one or more processors to perform:
receiving a fault message of the aircraft through the interface module; and
making a troubleshooting decision for making a field maintenance on said fault or making a troubleshooting decision for retaining said fault to continue a flight according to the fault message, and for maintenance personnel's reference, output outputting the troubleshooting decision for making the field maintenance;
wherein the one or more programs are executed by the one or more processors further to perform:
determining whether the fault is a retainable fault or a non-retainable fault;
in response to that the fault is a retainable fault, determining an occurrence probability for a non-retainable fault developed by a fault-associated part during a retention period of the fault, wherein the fault-associated part is a part associated with the fault;
calculating a field maintenance cost for said fault, and according to the following formula $C_K = P*(C_L + C_{EP} + C_{MP}) + (1-P)*C_L$, calculating a fault retention cost generated for continuing the flight with the fault retained at a planned maintenance time and/or at a planned maintenance location for repair;
comparing the fault retention cost with the field maintenance cost;
in response to that the fault retention cost is higher than the field maintenance cost, making the troubleshooting decision for making the field maintenance on said fault; and
in response to that the fault retention cost is equal to or lower than the field maintenance cost, making the troubleshooting decision for retaining said fault to continue the flight, wherein:

$C_K$ indicates said fault retention cost;

$C_L$ indicates a cost of flight operating limitation caused by retaining said fault;

P indicates a weight value obtained based on said occurrence probability;

$C_{EP}$ indicates an abnormal flight cost generated by said non-retainable fault developed by the fault-associated parts during the retention period of the fault;

$C_{MP}$ indicates a fault maintenance cost generated by said non-retainable fault developed by the fault-associated parts during the retention period of the fault.

2. The system for handling a fault of an aircraft according to claim 1, wherein the one or more programs are executed by the one or more processors further to perform:
   calculating said field maintenance cost according to one or more of following items: a cost of abnormal flight caused by the fault, a cost of change in other flights disrupted by the fault, a cost of providing required aviation materials, a cost of urgent maintenance in other places, and a cost of work hour for a maintenance.

3. The system for handling a fault of an aircraft according to claim 2, wherein the one or more programs are executed by the one or more processors further to perform obtaining said occurrence probability by analyzing a performance of said fault-associated part or a failure probability distribution of said fault-associated part.

4. The system for handling a fault of an aircraft according to claim 1, wherein the one or more programs are executed by the one or more processors further to perform acquiring configuration data of said aircraft and based on which to find fault statistical data corresponding to the configuration data of said aircraft and the fault message, then finding a fault cause according to the fault statistical data.

5. The system for handling a fault of an aircraft according to claim 4, wherein the one or more programs are executed by the one or more processors further to perform finding the fault cause according to the fault statistical data comprising finding one or more potential fault causes corresponding to the configuration data of said aircraft and the fault message, facilitate an implementation of fault location steps for locating said fault corresponding to the potential fault cause according to a probability of occurrence corresponding to each possible fault cause, and identifying the fault cause, wherein the probability of occurrence corresponding to each possible fault cause is acquired by an analysis of statistical data, possesses a defaulted or pre-estimated initial value, and is updated on a real-time basis according to a resultant location of the implementation of fault location steps.

6. The system for handling a fault of an aircraft according to claim 5, wherein said weight value is equal to said occurrence probability.

7. The system for handling a fault of an aircraft according to claim 1, wherein the troubleshooting decision for retaining said fault to continue a flight comprises a planned time and/or a planned location for repairing said fault.

8. The system for handling a fault of an aircraft according to claim 1, wherein the one or more programs are executed by the one or more processors further to perform:
   making a fault diagnosis according to said fault message so as to find a cause of the fault;
   generating a fault-handling solution according to result of the fault diagnosis, wherein said fault-handling solution comprises: a task, maintenance instructions and/or aviation materials and tools necessary to repair the fault.

9. The system for handling a fault of an aircraft according to claim 1, wherein the one or more programs are executed by the one or more processors further to perform identifying a work-hour period with lower utilization rate for maintenance personnel, and arrange said planned time in said work-hour period with lower utilization rate.

10. A method for handling a fault of an aircraft, comprising:
   receiving a fault message of the aircraft through an interface module comprising the following items: an onboard data interface between the system and an aviation telecommunication network or a mobile communication network configured to receive onboard data, a fault report interactive interface between the system and a user configured to receive a fault report inputted by the user, a WIFI/bluetooth interface between the system and a measuring tool or a measuring equipment configured to receive a measuring result of the measuring tool or the measuring equipment, and a software interface between the system and a software application or a software module configured to interact with the software application or the software module, wherein the onboard data comprise one or more of a real-time fault, an ACMS report, QAR data, and a fault maintenance sheet; and
   generating a troubleshooting decision for making a field maintenance on said fault or generating a troubleshooting decision for retaining said fault to continue a flight according to the fault message, and for maintenance personnel's reference, outputting the troubleshooting decision for making the field maintenance;
   wherein the generating a troubleshooting decision for making a field maintenance on said fault or generating a troubleshooting decision for retaining said fault to continue a flight according to the fault message comprises:
      determining whether the fault is a retainable fault or a non-retainable fault;
      in response to that the fault is a retainable fault, determining an occurrence probability for a non-retainable fault developed by a fault-associated part during a retention period of the fault, wherein the fault-associated part is a part associated with the fault;
      calculating a field maintenance cost for said fault, and according to the following formula $C_K=P*(C_L+C_{EP}+C_{MP})+(1-P)*C_L$, calculating a fault retention cost generated for continuing the flight with the fault retained at a planned maintenance time and/or at a planned maintenance location for repair;
      comparing the fault retention cost with the field maintenance cost;
      in response to that the fault retention cost is higher than the field maintenance cost, making the troubleshooting decision for making the field maintenance on said fault; and
      in response to that the fault retention cost is equal to or lower than the field maintenance cost, making the troubleshooting decision for retaining said fault to continue the flight,
   wherein:
   $C_K$ indicates said fault retention cost;
   $C_L$ indicates a cost of flight operating limitation caused by retaining said fault;
   P indicates a weight value obtained based on said occurrence probability;

$C_{EP}$ indicates an abnormal flight cost generated by said non-retainable fault developed by the fault-associated parts during the retention period of the fault;

$C_{MP}$ indicates a fault maintenance cost generated by said non-retainable fault developed by the fault-associated parts during the retention period of the fault.

11. The method for handling a fault of an aircraft according to claim 10, wherein said field maintenance cost is calculated according to one or more of following items: a cost of abnormal flight caused by the fault, a cost of change in other flights disrupted by the fault, a cost of providing required aviation materials, a cost of urgent maintenance in other places, and a cost of work hour for a maintenance.

12. The method for handling a fault of an aircraft according to claim 10, further comprising:

acquiring configuration data of said aircraft and based on which to find fault statistical data corresponding to the configuration data of said aircraft and the fault message, then finding a fault cause according to the fault statistical data.

13. The method for handling a fault of an aircraft according to claim 12, wherein finding the fault cause according to the fault statistical data comprising finding one or more potential fault causes corresponding to the configuration data of said aircraft and the fault message, facilitating an implementation of fault location steps for locating said fault corresponding to the potential fault cause according to a probability of occurrence corresponding to each possible fault cause, and identifying the fault cause, wherein the probability of occurrence corresponding to each possible fault cause is acquired by an analysis of statistical data, possesses a defaulted or pre-estimated initial value, and is updated on a real-time basis according to a resultant location of the implementation of fault location steps.

14. The method for handling a fault of an aircraft according to claim 10, wherein the troubleshooting decision for retaining said fault to continue a flight comprises a planned time and/or a planned location for repairing said fault.

15. The method for handling a fault of an aircraft according to claim 10, further comprising:

making a fault diagnosis according to said fault message so as to find a cause of the fault; and generating a fault-handling solution according to result of the fault diagnosis, wherein said fault-handling solution comprises: a task, maintenance instructions and/or aviation materials and tools necessary to repair the fault.

16. A method for handling a fault of an aircraft, comprising:

receiving a fault message of the aircraft through an interface module comprising the following items: an onboard data interface between the system and an aviation telecommunication network or a mobile communication network configured to receive onboard data, a fault report interactive interface between the system and a user configured to receive a fault report inputted by the user, a WIFI/bluetooth interface between the system and a measuring tool or a measuring equipment configured to receive a measuring result of the measuring tool or the measuring equipment, and a software interface between the system and a software application or a software module configured to interact with the software application or the software module, wherein the onboard data comprise one or more of a real-time fault, an ACMS report, QAR data, and a fault maintenance sheet;

acquiring configuration data of said aircraft and based on which to find fault statistical data corresponding to the configuration data of said aircraft and the fault message, then finding a fault cause according to the fault statistical data;

determining whether the fault is retainable or not according to the fault cause; and making a troubleshooting decision for making a field maintenance on said fault, for maintenance personnel's reference, outputting the troubleshooting decision for making the field maintenance.

17. The method for handling a fault of an aircraft according to claim 16, further comprising:

finding the fault cause according to the fault statistical data comprising finding one or more potential fault causes corresponding to the configuration data of said aircraft and the fault message, facilitating an implementation of fault location steps for locating said fault corresponding to the potential fault cause according to a probability of occurrence corresponding to each possible fault cause, and identifying the fault cause.

18. The method for handling a fault of an aircraft according to claim 17, wherein, the probability of occurrence corresponding to each possible fault cause is acquired by an analysis of statistical data, possesses a defaulted or pre-estimated initial value, and is updated on a real-time basis according to a resultant location of the implementation of fault location steps.

19. The method for handling a fault of an aircraft according to claim 17, further comprising:

facilitating the implementation of fault location steps for locating said fault corresponding to each associated possible fault cause on a basis of a high-to-low probability of occurrence.

20. The method for handling a fault of an aircraft according to claim 17, further comprising:

providing the one or more possible fault causes and their probabilities of occurrence for the user for selection, and promoting the implementation of fault location steps corresponding to a selected fault cause selected by the user.

21. The method for handling a fault of an aircraft according to claim 16, wherein the troubleshooting decision for making the field maintenance further comprising a fault-handling solution, wherein said fault-handling solution comprises: a task, maintenance instructions and/or aviation materials and tools necessary to repair the fault.

\* \* \* \* \*